(12) United States Patent
Ankner

(10) Patent No.: US 11,957,086 B2
(45) Date of Patent: *Apr. 16, 2024

(54) **CULTIVATION SYSTEMS AND METHODS FOR IMPROVEMENT OF PLANT *BAST FIBERS* OF PLANTS FROM THE FAMILY *CANNABACEAE SENSU STRICTO***

(71) Applicant: Charles E. Ankner, West Palm Beach, FL (US)

(72) Inventor: Charles E. Ankner, West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,564

(22) Filed: Mar. 16, 2022

(65) Prior Publication Data
US 2022/0201953 A1 Jun. 30, 2022

Related U.S. Application Data

(60) Continuation-in-part of application No. 16/907,286, filed on Jun. 21, 2020, which is a continuation-in-part of application No. 15/628,689, filed on Jun. 21, 2017, which is a continuation-in-part of application No. 15/455,805, filed on Mar. 10, 2017, now Pat. No. 10,631,479, which is a division of application No.
(Continued)

(51) Int. Cl.
*A01G 31/02* (2006.01)
*A01G 22/00* (2018.01)

(52) U.S. Cl.
CPC .............. *A01G 31/02* (2013.01); *A01G 22/00* (2018.02); *Y02P 60/21* (2015.11)

(58) Field of Classification Search
CPC ........ A01G 22/00; A01G 31/02; A01G 31/00; A01G 31/001; A01G 7/00; A01G 9/16; Y02P 60/21; Y02P 60/216
See application file for complete search history.

(56) References Cited

U.S. PATENT DOCUMENTS

| 891,176 A | 6/1908 | Von der Kramer |
| 987,805 A | 3/1911 | Von der Kramer |
| 2,051,460 A | 8/1936 | Von Skrbensky |

(Continued)

FOREIGN PATENT DOCUMENTS

| CN | 1253715 A | 5/2006 |
| CN | 101653089 B | 11/2011 |

(Continued)

OTHER PUBLICATIONS

Nkansah et al, Effect of Air and Root-zone Temperature on Physiological Characteristics and Yield of Heat Tolerant and Non Heat Tolerant Tomato Cultivars, J. Japan Soc. Hort. Sci. 64(2):315-320. 1995 [retreivable from internet at https://www.jstage.jst.go.jp/article/jjshs1925/64/2/64_2_315/_pdf].

(Continued)

*Primary Examiner* — Kent L Bell
(74) *Attorney, Agent, or Firm* — The Roy Gross Law Firm, LLC; Roy Gross

(57) ABSTRACT

Systems and methods relating to utilizing plant shoot-to-root temperature differentials alone or in conjunction gas mixture humidity about a plant shoot to improve plant bast fiber growth; the timing, sequence, and range of shoot-to-root temperature differentials selected during plant development utilized to modify and improve plant bast fibers for industrial, scientific, and medical use.

4 Claims, 5 Drawing Sheets

Related U.S. Application Data

14/046,050, filed on Oct. 4, 2013, now Pat. No. 9,622,426.

(60) Provisional application No. 63/162,215, filed on Mar. 17, 2021.

(56) References Cited

U.S. PATENT DOCUMENTS

| | | | |
|---|---|---|---|
| 2,051,461 A | 8/1936 | Lee | |
| 2,897,631 A | 4/1959 | Howsley, Jr. et al. | |
| 2,928,211 A | 3/1960 | Martin | |
| 2,952,096 A | 9/1960 | Hughes et al. | |
| 3,327,425 A | 6/1967 | Miroslav et al. | |
| 3,432,965 A | 3/1969 | Smith et al. | |
| 3,458,951 A | 8/1969 | Martin | |
| 3,931,695 A | 1/1976 | Widmayer | |
| 4,079,547 A | 3/1978 | Walker | |
| 4,332,105 A | 6/1982 | Nir | |
| 4,345,405 A | 8/1982 | Davis | |
| 4,411,101 A | 10/1983 | Springer et al. | |
| 4,486,977 A | 12/1984 | Edgecombe et al. | |
| 4,577,435 A | 3/1986 | Springer et al. | |
| 4,612,725 A | 9/1986 | Driver | |
| 4,662,105 A | 5/1987 | Lagow | |
| 4,669,217 A | 6/1987 | Fraze | |
| 4,817,332 A | 4/1989 | Ikeda et al. | |
| 4,850,134 A | 7/1989 | Snekkenes | |
| 4,983,307 A | 1/1991 | Nesathurai | |
| 5,001,859 A | 3/1991 | Sprung | |
| 5,209,012 A | 5/1993 | Palmer | |
| 5,501,037 A | 3/1996 | Aldokimov et al. | |
| 5,597,731 A | 1/1997 | Young et al. | |
| 5,642,587 A | 7/1997 | Janes et al. | |
| 5,771,634 A | 6/1998 | Fudger | |
| 5,813,168 A | 9/1998 | Clendening | |
| 5,922,316 A | 7/1999 | Smith et al. | |
| 5,992,090 A | 11/1999 | Stutte et al. | |
| 6,105,309 A | 8/2000 | Takayanagi | |
| 6,148,559 A | 11/2000 | May | |
| 6,216,390 B1 | 4/2001 | Peregrin Gonzalez | |
| 6,389,751 B1 | 5/2002 | Wang | |
| 6,581,327 B2 | 6/2003 | Adelberg et al. | |
| 7,069,689 B2 | 7/2006 | Craven et al. | |
| 7,617,057 B2 | 11/2009 | May et al. | |
| 7,987,632 B2 | 8/2011 | May et al. | |
| 8,009,048 B2 | 8/2011 | Hyde et al. | |
| 8,291,639 B2 | 10/2012 | Gardner et al. | |
| 8,305,214 B2 | 11/2012 | Hyde et al. | |
| 8,443,546 B1 | 5/2013 | Darin | |
| 8,881,454 B2 | 11/2014 | Janney | |
| 2004/0194371 A1 | 10/2004 | Kinnis | |
| 2004/0244283 A1 | 12/2004 | Chen | |
| 2007/0289207 A1 | 12/2007 | May et al. | |
| 2009/0223128 A1 | 9/2009 | Kuschak | |
| 2011/0250705 A1 | 10/2011 | Polonsky et al. | |
| 2012/0210640 A1 | 8/2012 | Ivanovic | |
| 2014/0033609 A1 | 2/2014 | Tyler et al. | |
| 2014/0259920 A1 | 9/2014 | Wilson | |
| 2014/0290131 A1 | 10/2014 | Nskeep | |
| 2014/0325908 A1 | 11/2014 | Faris | |

FOREIGN PATENT DOCUMENTS

| | | |
|---|---|---|
| NL | 1020694 A1 | 9/2002 |
| TW | 20080106998 A | 9/2009 |

OTHER PUBLICATIONS

Nelson, Clarence H., Growth Responses of Hemp to Differential Soil and Air Temperatures, Plant Physiol. Apr. 1944;19(2): 294-309. Missouri Valley College, Marshall, Missouri, US. (available at http://www.ncbi.nlm.nih.gov/pmc/articles/PMC438156/?page=1).

Weaver, John E. and Bruner, William E., Root Development of Vegetable Crops, McGraw-Hill Book Company, Inc., (1927), New York, NY. Mcgraw-Hill Book Company, Inc. New York, NY US (available at http://www.sustainablefarmer.com/pdflibrary/library-rootdevelopment.pdf).

Jenson, Merle H., Controlled Environmental Agriculture in Deserts, Tropics and Temperate Regions—A World Review, University of Arizona, College of Agriculture and Life Sciences, (2010), Tucson, AZ 85721 US (Paper # 1-125933-03-00) (available at http://ag.arizona.edu/ceac/sites/ag.arizona.edu.ceac/files/jensen%20Taiwan%20World%20Review%20of%20CEA.pdf).

Trejo-Tellez, Libia I. and Gomez-Merino, Fernando C., Nutrient Solutions for Hydroponic Systems, Colegio de Postgraduados, Montecillo, Texcoco, State of Mexico, MX. (available at http://www.scribd.com/doc/146659132/145078534-InTech-Nutrient-solutions-for-hydroponic-systems-1-pdf-1-pdf#scribd), (2012) , 23 pages.

Diaz-Perez, Juan C., Root Zone Temperature, Plant Growth, and Fruit Yield of Tomatillo as Affected by Plastic Film Mulch, HortScience 40(5):1312-1319., (2005). Department of Horticulture, Coastal Plain Experiment Station—Tifton Campus, University of Georgia, Tifton, GA 31793-0748 US. (available at http://hortsci.ashspublications.org/content/40/5/1312.full.pdf).

Reddell, Paul., Bowen, G.D., and Robson, A.D., The Effects of Soil Temperatures on Plant Growth, Nodulation and Nitrogen Fixation in Casurina Cunninghamiana MIQ., New Phytol. 101, 441-450, doi: 10.1111/j.1469-8137.1985.tb02850.x. (1985) US. (available at http://onlinelibrary.wiley.com/doi/10.1111/j.1469-8137.1985.tb02850.x/abstract).

McMichael, B.L., and Quisenberry, J.E, The Impact of Soil Environment on the Growth of Root Systems, Environmental and Experimental Botany; USDA-ARS Cropping Sys Research Lab, Plant Stress and Water Conserv. Research Unit, Rte 3, Box 215, Lubbock, TX 79401 US; Environmental and Experimental Botanay, vol. 33, No. 1, pp. 53-61, 1993. GB. (available at http://naldc.nal.usda.gov/download/34787/PDF).

Larigauderie, A. et al., The Effect of Root and Shoot Temperatures on Growth of Ceanothus Greggi Seedlings, Annuls of Botany; 67, 97-101, (1991).

Andronius, The Ideal Conditions to Grow Marijuana, Grasscity Forum, 2009 (available at https://forum.grasscity.com/threads/the-ideal-conditions-to-grow-marijuana-list.446508/).

Tindall, James, et al., The Effect of Root Zone Temperature on Nutrient Uptake of Tomato, Journal of Plant Nutrition, 13:8, 939-956, DOI: 10.1080/01904169009364127, (1990).

Katsoulas, et al., Impact of Greenhouse Microclimate on Growth and Development with Special Reference to the Solanaceae, The European Journal of Plant Science and Biotechnology, (2008).

Moorby, J., et al., Root and Air Temperature Effects on Growth and Yield of Tomatoes and Lettuce, Acta Horticulture 98, (1990).

Saski and Itagi, Effect of Root Cooling Treatment of Nutrient Solution on Growth and Yield of Tomato, Cucumber and Melon, Environment Control in Biology, (1989).

Ramamoorthy, et al., A Review of Natural Fibers Used in Biocomposites: Plant, Animal and Regenerated Cellulose Fibers, Polymer Reviews, 55:1, 107-162, DOI: 10.1080/15583724.2014.971124 (2015).

CULTIVATION SYSTEMS AND METHODS FOR IMPROVEMENT OF PLANT *BAST FIBERS* OF PLANTS FROM THE FAMILY *CANNABACEAE SENSU STRICTO*

CROSS REFERENCE TO RELATED APPLICATIONS

The present application claims priority to U.S. Provisional Patent Application Ser. No. 63/162,215, filed Mar. 17, 2021, entitled Cultivation Systems and Methods for Improvement of Plant Bast Fibers. This application is also a continuation in part of U.S. patent application Ser. No. 16/907,286, filed Jun. 21, 2020, entitled Preventing Treating and Eliminating Infection and Infestation of Plantae Sensu Lato by Pathogens and Pests, which is a continuation in part of U.S. patent application Ser. No. 15/628,689, filed Jun. 21, 2017, entitled Method of Improving the Growth and Production Output of Plants of the Family Solanaceae, published as U.S. Patent Application Publication No. 2017/0280643, which is a continuation in part of U.S. Patent Application Ser. No. 15/455,805, filed Mar. 10, 2017, entitled Method of Improving the Growth and Production Output of Plants of the Family Cannabaceae sensu stricto, published as U.S. Patent Application Publication No. 2017/0181392, now U.S. Pat. No. 10,631,479, which is a divisional application of U.S. patent application Ser. No. 14/046,050, filed Oct. 4, 2013, entitled Method of Improving the Growth and Production Output of Plants of the Family Cannabaceae sensu stricto, published as U.S. Patent Application Publication No. 2015/0096230 A1, now U.S. Pat. No. 9,622,426, the contents of which are all incorporated herein by reference in their entirety.

FIELD OF THE INVENTION

The present inventive system and method relates to improving the growth and development of plants. More specifically, the present invention relates to a systems and methods of utilizing shoot-to-root temperature differentials alone, and in conjunction with changes to gas mixture humidity about a plant shoot, to improve plant bast fiber growth and development for industrial, scientific, and medical use.

BACKGROUND OF THE INVENTION

In the beginning God made heaven and earth. . . . Then God said, 'Behold, I have given you every seed-bearing herb that sows seed on the face of all the earth, and every tree whose fruit yields seed; to you it shall be for food. I also give every green plant as food for all the wild animals of the earth, for all the birds of heaven, and for everything that creeps on the earth in which is the breath of life.' It was so. Then God saw everything He had made, and indeed, it was very good. So evening and morning were the sixth day. Book of Genesis, Chap 1:1, 29-31, commonly attributed to the Yahwist, circa 5$^{th}$ Century B.C.E, as translated and interpreted in The Orthodox Study Bible: Ancient Christianity Speaks to Today's World, Thomas Nelson Publishing, 2008, USA.

. . . the greatest service which can be rendered to any country is to add a useful plant to its culture; especially a bread grain, next in value to bread, is oil., Thomas Jefferson, 3$^{rd}$ President of the United States of America, Memorandum of Services to My Country, 1800, Charlottesville, Virginia, USA.

Damn it Charles, no damn goodwill ever come of this *Cannabis* crap! Plus, it's illegal! Excited utterance of Frank G. Ankner, father of instant inventor, 1978, Lake Worth, Florida USA.

You don't need another hobby . . . , Teresa Ann (Ettles) Ankner, late wife of instant inventor, throughout their twenty-three-year marriage, USA.

The importance and value of plant bast fibers in the world is difficult to relate or overstate. Much of modern civilization would not exist without items made from and/or including plant bast fibers.

Modernly, there is global concern regarding the use of non-renewable synthetic materials in manufacturing; with societal pressure, both consumer and regulatory, for products that are more environmentally friendly and reduce dependence on fossil fuels. As a result, the use of natural biofibers in products and composites continues to grow; and are major industrial instruments towards future biobased economies.

Almost exclusively, all modern textiles comprise fibers; including natural and synthetic fibers. Such plant-based cellulosic fibers include:

Seed fibers: cotton, luffa, kapok;
Leaf fibers: sisal, abaca, fruit fibers, banana, pineapple, coir;
Stalk fibers from agricultural residues: wheat and rice, corn, soft and hardwood, cane, grasses and reeds, switch grass, bamboo;
Modified natural cellulose; micro-fibrillated, nanocrystals, nanofibers;
Modified natural polymers: mycelium, chitosan, alginate; polysaccharides; and:
Bast fibers: such as jute, hemp-*Cannabis*, flax, ramie, and kenaf.

The term bast may derive from Old English bœst, from proto-Germanic bastaz (bast, rope), and may have the same Latin root as fascis (bundle) and Middle Irish basc (necklace).

Unlike synthetic and/or chemically modified fibers; biofibers abound in nature in fibrous materials, especially those in the cellulosic category. Hemp-*Cannabis* is one of the oldest, if not the oldest, cultivated fiber plants and is currently finding renewed commercial interest; including all parts of the plant's fibrous material, as well as seeds and flowers.

Biofibers possess advantages over synthetic fiber types, including: widespread availability, low density, good modulus-weight ratio, high acoustic damping, low manufacturing energy consumption and cost, low resulting carbon footprint, and biodegradability.

Generally desirable properties of both natural and synthetic fibers, include: high length to diameter ratio (i.e., fineness), flexibility, tensile strength; extensibility and elasticity; resistance to chemicals, resistance to heat and sunlight; and ability to accept and hold pigmentation.

With growing concern for environment protection; the value of natural fibers is significantly increasing. As a renewable resource, the cultivation and use of natural fibers, and especially bast fibers provides actual reduction of carbon and carbon dioxide emission while minimizing industrial waste. Cultivation of hemp-*Cannabis* on one acre during one growing period causes absorption of approximately two-and-one-half tons of carbon dioxide from the air. In stark contrast, producing one ton of synthetic polypropylene fiber emits more than three tons of carbon dioxide into the air in only a few hours period.

Hemp-*Cannabis* Bast Fiber Types

Short hemp-*Cannabis* bast fibers produced during separation are known as tow, with long hemp-*Cannabis* bast fibers called line fiber. Hemp-*Cannabis* line fiber can be incredibly long—depending on the height of the plant; bundles and single strands reaching up to twenty feet in length.

Typically, once separated line fiber is cleaned and carded to size; then cut and bailed for further processing. Tow is typically simply compressed and bailed.

Hemp-*Cannabis* tow is used for stuffing or coarse yarn spinning; with line fiber for higher-end applications such as clothing fabrics, furnishings and floor coverings.

Hemp-*Cannabis* Fiber Yield

Generally, three-and-one-half percent (3.5%) of green unprocessed of industrial hemp-*Cannabis* by weight can be processed into dry line fiber; and one percent (1%) to dry tow. [Inventor's editorial notation: every part of an industrial hemp-*Cannabis* plant has modern utility. Leaves as compost and soil augmentation material; solid hurd as and for paper, plastics, and insulation products. Even non-fibrous dust particles created during hemp-*Cannabis* stalk decortication may be collected and compressed into pellets as and for fuel].

Hemp-*Cannabis* Fiber Advantages and Benefits

Arguably, hemp-*Cannabis* bast fiber is superior to other vegetable biofibers; both in terms of cultivation and application. Its many advantages include: fewer inputs required to cultivate, pest and disease resistance (partly due extremely high growth rate); low lignin levels enable environmentally friendly bleaching without the use of chlorine; far more fiber harvested per acre than cotton or flax; strongest of the natural fibers, less stretch (clothing retains its shape); softness increases with use; when dyed retains pigment better than cotton; better warmth and, antibacterial properties, excellent breathability, high abrasion resistance, resistant to mold and mildew, and superior ultraviolet light blocking attributes.

Referring to Prior Art FIG. 1; depicted is a fundamental schematic cross-sectional diagram of a bast fiber bearing plant stem (100). The diagram depicts the stem epidermis (110), primary bast fiber bundles (115), secondary bast fiber bundles (120) the hurd or core (125) and a hollow inner core (130).

Bast fibers (115, 120) are found within the stem phloem (135) and occur in bundles (115, 120) that are glued or gummed together by pectin and/or calcium ions.

Prior Art FIG. 2 depicts a categorization chart of various fiber types.

From non-patent literature by: Sunil Kumar Ramamoorthy, Mikael Skrifvars and Anders Persson, *A Review of Natural Fibers Used in Biocomposites: Plant, Animal and Regenerated Cellulose Fibers*, Polymer Reviews, 55:1, 107-162, DOI: 10.1080/15583724.2014.971124 (2015); herein ("Ramamoorthy").

"Plant Fibers

The fibers from the plants can be in the form of hairs (cotton, kapok), hard fibers (coir, sisal), and fiber sheaves (flax, hemp, jute). The plant fibers are classified depending on their utility such as primary and secondary. Plants to be used as fibers for primary utilities include hemp, jute, kenaf, etc., while the byproducts of plants such as coir, pineapple, etc., belong to the secondary group.

There are six types of plant fibers namely bast fibers (flax, hemp, jute, kenaf, and ramie), leaf fibers (abaca, pineapple and sisal), seed fibers (coir, cotton, and kapok), straw fibers (corn, rice, and wheat), grass fibers (bagasse and bamboo), and wood fibers (softwood and hardwood). The major chemical composition of plant fibers is lignocellulose (cellulose, hemicellulose, and lignin) and the quantity of these components change from plant to plant. This is due to age, species, and could also vary in different parts of the same plant. These basic components partially determine the physical properties of the fibers. These polymers could be distributed unevenly throughout the plant cell wall which makes it difficult to know the composition and properties of the fibers. Cotton fiber has the highest amount of cellulose while coir fiber has the highest amount of lignin.

Cellulose is the strongest and stiffest component of the fiber which is linear 1,4-β-glucan polymer consisting D-anhydroglucose (C6H11O5) repeating units containing hydroxyl groups. The OH groups form inter- and intra-molecular hydrogen bonding making it hydrophilic in nature. The cellulose chemical structure remains the same for all the natural fibers while the degree of polymerization changes, which influences the mechanical properties of the fibers. It has been observed that bast fibers have the highest degree of polymerization compared to most of the other plant fibers. Lignin is the phenolic compound which is believed to support the structure of the plant, and it is also resistant to microbial degradation until disturbed through physical/chemical treatment. The chemical structure of lignin is not clear until today even though most of the functional groups and units are identified. Lignin is believed to be a binder which links the celluloses to retain the structure of the plant. The wax content of the fiber plays a crucial role on processing composites as it influences wettability when the matrix is introduced, furthermore influencing interfacial fiber-matrix adhesion.

Variation in natural fiber properties are a result of several factors such as geographical location of the plant, maturity, size, chemical composition, part of the plant from which fibers are extracted, etc. The variation can also be attributed to different stages: growth, harvesting, fiber extraction, and storage, and each stage has several influencing factors. It is demonstrated that the strength of the fiber is also related to fibrillar angle and physical properties of the fiber. Small fibrillar angle, small fiber diameter, and high aspect ratio give high mechanical properties. Owing to low density and relatively good strength and modulus of natural fibers, these fibers are preferred reinforcements in several applications. The high strength of kenaf and ramie fibers and the low strength of coir fiber could be attributed to high and low cellulose content. The modulus of kenaf and ramie fibers can be compared to that of man-made fibers. The natural fibers are hydrophilic by nature and have substantial amount of moisture content which influences the mechanical properties. In general, high amount of cellulose, high relative humidity, high pore volume, and low crystallinity in fibers tend to cause high moisture content.

The cost of natural fibers is substantially low when compared to synthetic fibers such as carbon, steel, and glass. Performance price ratio (modulus/cost) of natural fibers is several times higher than that of man-made fibers. As the result of continuous decline in the availability of natural resources to produce synthetic fibers, the cost of these fibers is expected to increase. So, renewable raw material production and contribution to fiber market continue to rise. The data showed that the production of jute fibers is higher than that of E-glass; it also shows that the amount of flax and sisal produced together crosses the quantity of E-glass produced.

Bast Fibers

Flax

Flax (*Linum usitatissimum*) is a food and fiber crop mainly produced in Canada, France, and Belgium. Nowadays, it is predominantly grown for fiber and linseed oil and accounts 830×103 ton. It is one of the oldest fiber crops and its fiber is one of the first to be spun and woven into textiles. Reports claim that the flax fibers were used for many applications well before 5000 BC in Egypt and Georgia. High grade long fibers are usually made into yarns for textiles and the low-grade fibers are used as reinforcements/fillers in composites. The average flax plant grows up to 90 cm tall and possesses strong fibers along the stem which is composed of bark, phloem, xylem, and center void. Macro and microscopic analyses have been performed to see the fiber bundles and hierarchical organization. The chemical composition of the flax fibers varied with different authors which underlines high dependence on the flax fibers used. Flax fiber is considered for reinforcement as it has high cellulose content and a high degree of crystallinity which makes it stronger and stiffer.

The tensile strength of the fiber is between 345 and 1100 MPa. The modulus of the fiber is 27.6 GPa and the percentage elongation of the fiber is between 2.7 and 3.2%. Good quality flax fiber has the best tensile properties compared to other bast fibers. The tensile deformation of flax fiber and divided the stress-strain curve into three parts: linear strain (0 to 0.3%), non-linear strain (0.3 to 1.5%) and end linear strain (1.5% to fracture). The reasons for each of the segments are loading of fiber, alignment of micro-fibrils along machine direction, and response of the micro-fibrils. Similar tensile strain response was obtained by other researchers. Variation of tensile properties of flax fibers were studied based on the fiber location in a stem, plant variety and place of cultivation. It showed that the fibers extracted from the middle of the stem had the highest strength and modulus. The effect of moisture absorption and drying of flax fibers were investigated and the results showed that both the moisture intake and drying affected the tensile properties. Defects in the cell wall, diameter of the fiber, and testing condition (gauge length) are few other reasons for the variation of tensile properties of flax fibers. A detailed study was done and it was discovered that all the above factors affected the tensile properties. Flax fibers are used as reinforcements in several natural fiber composite applications as it has good tensile properties, availability and is studied extensively, apart from its environmental and economic benefits.

Hemp

Hemp (*Cannabis sativa*) is also a bast fiber crop cultivated mainly in China and France for fiber, oil, and seed. *Cannabis* family plants were indigenous to central Asia and were believed to have reached Europe in the Iron Age. Today, it is also widely grown in temperate climate countries such as Chile, North Korea, India, Japan, and many European Union (EU) countries. EU considers promoting hemp cultivation in member countries by subsidy and is looking forward for further developments. Nowadays, hemp is used in several applications such as textile fiber, paper, composite fiber, seed food, oil, wax, resin, pulp, biofuel, etc., and its usage mainly depends on the grade/quality of the hemp plant. The hemp plant secretes small amounts of tetrahydrocannabinol (THC) which is famous for the medicinal and recreational use.

Reports suggest that the oldest hemp fabric dates back to 8000 BC (The Columbia History of the World). Hemp fiber cultivation was briefly banned between 1971 and 1993 to avoid misuse and on lifting the ban, it has grown exponentially but still hemp fiber counts less than 0.5% of total natural fiber production: 214×103 ton. The average height of industrial hemp is 10 feet and the width is normally very narrow as it is grown close together. Hierarchical organization of hemp fiber and fiber bundle size were analyzed by several authors. It has been reported that the diameter of the average fiber bundle is 25 μm and the length of the average fiber bundle is 25 mm. The chemical composition of the hemp fiber varied with different authors; cellulose content varied from 70.2% to 74.4%. Even though it has several applications, owing to its high strength and stiffness hemp fiber is also used as reinforcement in biocomposites. The variation in the chemical composition due to several factors leads to variability in mechanical properties of the hemp fibers. The plant population affected the hemp fiber morphology and the physical properties of the fiber which was studied over a 4 year research by Amaducci et al. 102 Similar research was done in the colder country, Sweden, taking several growing conditions into account. The tensile strength of the fiber is around 690 MPa and the modulus is between 30 and 60 GPa. The percentage elongation is around 1.6%. The stress-strain curve obtained by tensile test had a similar trend to that of jute fibers. The variation of tensile properties is evident and common to all natural fibers, and this will continue as there are several factors which are uncontrollable in a large-scale set up. The tensile properties of the hemp fibers were studied based on the age of the plant and testing parameters.

It was found that a fully matured plant had better tensile strength than the partly matured plant; it was also found that the testing parameter and gauge length affected the tensile strength of the hemp fiber.

Jute

Jute (*Corchorus capsularis/Corchorus olitorius*) is mainly grown for its fiber and it is one of most important natural fibers after cotton. It belongs to bast fiber and is one of the cheapest fibers grown in tropical regions. History of jute dates back to 206 BC-221 AD; jute paper was discovered in Dunhuang, Gansu Province, China and was believed to be produced during the reign of the Western Han Dynasty. Historical documents show that the jute fibers were used predominantly in India during the era of Mughal Emperor Akbar (1542-1605).

The British East India Company traded jute from India. Since then, jute has been one of the chief fibers in terms of usage, consumption, production, and availability. The jute fiber industry grew big during 1800s in Dundee, Scotland. The global production of jute fibers is around 2300×103 ton and major portion of it is contributed by India, China, and Bangladesh. The height range of the jute plant is between 2-4 m and the fibers are drawn by the retting process. Jute fibers were studied to understand the fiber structure and the properties. The chemical composition of jute fibers was studied by various researchers and the results show the range of cellulose content between 61%-71.5%. Availability of the jute fiber in large quantities makes it popular reinforcement among German automotive manufacturers.

The tensile strength of the jute fibers varies from 393 MPa to 773 MPa according to different authors. The modulus of the fiber is 13-26.5 MPa and the elongation is 1.2-1.5%. Jute fibers absorb most water in bast fibers. It is one of the most explored fibers for reinforcements; epoxy composites, PLA composites, polyester amide composites, phenolic composites, etc.

Kenaf

Kenaf (*Hisbiscus cannabinus*) is cultivated in tropical regions mainly for its fiber and seed oil. It is primarily considered as a central Africa and southern Asia crop, and today it is grown primarily in India and Bangladesh. It is a new crop in the US and has shown good potential in biocomposite applications. It is believed that kenaf has been cultivated since around 4000 BC. In ambient conditions the plant may grow up to 10 cm/day and matures in 3 months. As it is a fast growing crop it can annually yield up to 10000 kg/ha and the latest varieties may yield 30000 kg/hg annually.

The average plant grows 3 m tall with a woody base diameter 3-5 cm. The bast (bark) constitutes about 40% of the plant where the fibers are extracted and the remaining part is core wood. The bark has high crystalline fiber orientation while the core wood has an amorphous pattern. The stem diameter is often 1-2 cm. It has environmental and economic advantages; energy consumption to produce 1 kg of kenaf is 15 MJ while it takes 54 MJ for glass fibers and the cost of the fibers is considerably low. The properties of the kenaf fiber are similar to that of jute fibers and the structure of kenaf fiber is the same as other natural fiber. It has the lowest cellulose content (31-39%) and the highest lignin content (15-19%) among bast fibers.

The tensile properties of the kenaf fibers: it possesses a tensile strength and modulus of about 930 MPa and 53 GPa, respectively. The percentage elongation is around 1.6%. Several composites were made by reinforcing kenaf fibers in thermoset and thermoplastic matrix.

Ramie

Ramie (*Boehmeria nivea*) is the bast fiber that is native to Asia and today it is mainly produced in China and Brazil. It has been grown in China for many centuries and is commonly referred to as "China Grass". It is an herbaceous perennial plant belonging to the Nettle family and can be harvested 3-6 times a year. The plant lasts for around 7-20 years and grows 1-2.5 m tall. The presence of gum, pectin, and other substances in the bark makes the chemical treatment mandatory before the usage of the fibers. The fibers are coarse and have thick walls. The global production of these fibers is around 100×103 ton and it is lowest among bast fibers. The ramie fiber has the least amount of lignin content amount in bast fibers (0.6-0.7%) and has cellulose content of about 68.6-76.2%. The low production and impure nature of the plant makes it difficult to consider it as reinforcement for composite in large scale.

Tensile strength and modulus is 400-938 MPa and 61.4-128 GPa, respectively. The elongation is about 1.2-3.8%. Ramie fiber is the stiffest among bast fibers. Ramie fibers were reinforced in many thermoset and thermoplastic resins to produce biocomposites. Ramie fibers are comparatively less explored than any other mentioned bast fibers due to the above-stated issues (availability and impure) and most of the ramie fibers are consumed domestically." (end quote of Ramamoorthy).

Bast Fiber Separation

The bast fiber separating process is commonly called retting; and may be achieved using methods known as: dew, stand, cold water, warm water, mechanical, ultrasound, stream explosion, enzyme, and chemical/surfactant retting, or the like; to release the bast fiber from the hurd.

More robust retting and degumming techniques separate the bast fiber bundles into individual or elementary fibers free of pectin/calcium which fibers can be several centimeters to meters long depending upon the plant variety.

A very advantageous property of bast fibers is a unique and specific plant structure known as fiber nodes; which provide a bend or dislocation point along a fiber which provide for flexibility without fiber breakage. Conversely, seed hairs such as cotton, do not have fiber nodes.

Bast fibers are typically classified as soft or flexible fibers; while leaf fiber classified as hard or stiff fibers.

Modernly, bast fibers are used to produce woven or matrixed textiles such as; insulations and padding, carpets, threads and yarns, ropes, geotextiles, canvas/burlaps, clothing fabrics, paper-stock, and the like. Bast fibers are also used in non-woven and composite technology industries for producing pressed and machined mats and carpets, composite boards and materials used in automobile door panels and headliners, and the like.

Both ancient and modernly; the leading bast fiber bearing plant types cultivated worldwide are flax, hemp-*Cannabis*, and ramie.

In known plant husbandry methods and systems, the temperature of a plant growing medium, such as soil, soil replacements, liquids, reservoirs, aquaponic misting, and the like; maintain plant root system temperature within a few degrees of that of the air/gas mixture about the plant shoot. In other words, in known plant husbandry methods and systems, "the plant roots are maintained as hot or as cold as the plant shoot".

Lowering plant growing medium and/or nutrient solution temperature, dissolved oxygen saturation levels of the nutrient solution within the growth medium may be increased which in turn increases oxygen and nutrient uptake by the plant. In basic terms; the lower the growth medium temperature and nutrient solution, the more oxygen may be dissolved within the solution; which increases dissolved oxygen and increases permeability of plant roots to water and minerals, which increases plant water and nutrient uptake; thus, increasing the overall growth rate and health of the plant.

As may be deduced, there is interplay between plant solution oxygen solubility and plant nutrient uptake. As oxygen solubility increases, so does nutrient uptake. Ordinarily, this increase would be viewed as advantageous; however, in many or most hydroponic or aquaponic growing methods and systems, as well as in irrigated outdoor farming, nutrient solutions and/or fertilizers have preferred and specific nitrogen-phosphorous-potassium (hereinafter "N-P-K") concentrations tailored to specific varieties of plants, and further tailored to the growth phases of those plant varieties and varietal strains being grown. Many of these N-P-K formulations are high in concentration and intended to maximize crop yield; and yet be at levels just below a point which begins to damage or "chemically burn" or "overdose" the plant. As selected plant nutrient solution temperatures are lowered, the increased nutrient uptake of the plant requires differing solution N-P-K concentration levels and ratios to improve overall plant development without damaging or chemically burning the plant.

Known plant growing methods and systems include:

U.S. Pat. Appln. No. 2012/0210640 by Ivanovic discloses a hydroponic growth system wherein nutrient solution temperature is an environmental parameter monitored and controlled by automatic means.

U.S. Pat. Appln. No. 2009/0223128 by Kuschak discloses a hydroponic growth system wherein nutrient solution temperature is an environmental parameter monitored and controlled by automatic and remote means.

U.S. Pat. No. 8,443,546 to Darin discloses a hydroponic growth system wherein a small self-contained water chiller is optionally provided for reducing high nutrient solution reservoir temperatures caused by close proximity to high heat illumination sources.

U.S. Pat. No. 6,216,390 to Peregrin Gonzalez discloses a hydroponic system wherein the nutrient solution temperature is utilized to maintain the air temperature about the plants being grown.

U.S. Pat. No. 5,813,168 to Clendening discloses a greenhouse hydroponic system wherein the nutrient solution temperature is held at approximately 55° F. and utilized to maintain the air temperature about the plants being grown.

U.S. Pat. No. 5,771,634 to Fudger discloses a small home-style computer controlled hydroponic system which automatically maintains various growing parameters such as air temperature, air humidity, illumination cycles, and nutrient solution recirculation.

U.S. Pat. No. 5,501,037 to Aldokimov, et al. discloses an industrial hydroponic system wherein the frequency and duration of nutrient solution release is modified and controlled in accordance with the ambient air temperature.

U.S. Pat. No. 4,669,217 to Fraze is directed to and discloses among other things a modularized, computer controlled, twin (upper and lower) compressed gas activated nutrient solution reservoir plant propagation system, for integration installation and use in greenhouses. Stated relevant objects of Fraze include: " . . . to provide a plant propagation system and apparatus that is computer controlled to achieve optimum or maximum plant growth potential." (Col. 2 Ln 61-64), " . . . to provide a plant propagation system and apparatus in which the parameters of plant growth rate and maturity, nutrient temperature, plant exposure to nutrient time, air temperature, air humidity and nutrient quality are controlled by a computer to achieve optimum or maximum plant growth potential." (Col. 2 Ln. 65-68-Col. 3 Ln 3); and " . . . to provide a plant propagation system and apparatus utilizing a two-reservoir nutrient system in which nutrient is periodically transported from a first reservoir to a second reservoir containing the roots of the plant being propagated and back to the first reservoir whereby the plant roots are cyclically exposed to the nutrient solution . . . " (Col. 3 Ln 9-14).

Taiwan Pat. Appln. No. TW 20080106998 by Chen discloses a hydroponic method which holds plant nutrient solution temperature at 64° F. during winter and 72° F. during summer so plants survive ambient air temperature extremes and reduce the cost of maintaining the ambient air temperature about plant shoots to between 41° F. and 95° F., while preventing plant damage at ambient air temperatures above and below that range.

Chinese Pat. No. CN1253715A to Zhaozhang discloses a method of planting young fruit trees out of season by providing heating pipes about the tree root system, trunk, and branches.

Chinese Pat. Appl. No. CN101653089A by Wu discloses a method of protecting crops from low ambient air temperatures by providing irrigation pipes about the plant root system and supplying warm irrigation solution to keep both the root system and by evaporation the plant shoot system warm.

No known method or system discloses or teaches intentionally providing a temperature differential between the shoot and root systems of a plant for any reason or for any purpose; nor do they state, suggest, imply, nor infer any motivation for one of ordinary skill in the art to do so.

Moreover, all known methods and systems teach away from providing a plant shoot to root temperature differential; indicative of the still common and yet entirely errant notion that plant shoot temperature and plant root temperature should be approximately the same throughout all growth phases of plant development.

In Growth Responses of Hemp to Differential Soil and Air Temperatures, by Clarence H. Nelson, Plant Physiol. 1944 April; 19(2): 294-309, (hereinafter "Nelson", and hereby incorporated by reference in its entirety) explains that specific development changes occur in *C. sativa* L. plants (i.e., hemp-*Cannabis*) grown in such temperature differential environments.

Nelson experimenters placed *C. sativa* L. into four unchanged temperature conditions (series), remaining unchanged throughout the vegetative growth of the plants. The four temperature conditions Nelson used where:

Shoot at 86° F., and roots at 86° F., (hereinafter "H/H").
Shoot at 86° F., and roots at 60° F., (hereinafter "H/L").
Shoot at 60° F., and roots at 86° F., (hereinafter "L/H").
Shoot at 60° F., and roots at 60° F., (hereinafter "L/L").

Nelson observed and concluded: All four temperature series plants developed uniformly for the first four weeks of growth, with significant developmental changes being observed after seven weeks of growth.

The H/H plants: Vegetative growth was the most robust, with the smallest internodal length and stem diameter until maturity, and with the greatest root development. Specifically, H/H series plants exhibited the maximum stem elongation; greatest number of nodes produced; earliest blossom and seed formation; least aggregate leaf area; greatest number of leaf abscissions; and the highest absolute water consumption during growth.

The H/L plants: Both the aggregate number of leaves produced and the total leaf area per plant where smaller than in any other series. The leaves themselves were relatively thin and more finely veined. This series showed the least anabolic efficiency as noted by their low fresh and dry weight per plant. There was a possibility of impaired translocation of reserves into the region below the ground line due to low root temperatures.

The L/H plants: Had the maximum stem diameter and greatest internodal length. Leaves were very coarse in texture, large in size, and extremely thick. Leaf abscission was lowest of the four series, and leaf and stem production was favored. Plants of this series had the largest stem diameter, largest individual leaves, and highest aggregate dry weight.

The L/L plants: The leaves on these plants were relatively large, attaining the maximum area per leaf of the four series. Though the stems attained a height only slightly greater than in the L/H plants, the stem diameter was relatively large. The vegetative habit was essentially similar to L/H plants except as to stem length. Nelson is completely silent related to plant bast fibers.

Dutch Pat. Appln. No. NL1020694 to/by Korsten (hereinafter "Korsten") discloses making use of the principle of an inverted or reverse temperature gradient for saving energy heating a greenhouse environment. By placing the plants as close together as possible, combined with the use of insulating materials placed around the plant containers, a 20-30% energy saving is purported by creating a "microclimate" about each plant (disclosed as a 1-meter space or sphere about the plant).

Korsten also discloses a 7° C. temperature gradient between the greenhouse environment and the growing medium about the plant roots. However, Korsten fails to disclose a distance from the plants from which this gradient extends. Therefore, the 7° C. temperature gradient value disclosed is meaningless. However, if the distance from the plant is presumed to be the disclosed "micro-climate" of 1 meter, then it can be inferred that Korsten discloses a temperature gradient of no greater than 7° C. for every 1-meter distance from the plant root system.

A stated objective of Korsten is to save energy in heating a greenhouse by grouping plants together, providing heat to the growing medium about the roots, and creating a "micro-climate" about the plants, and that this "micro-climate" will aid a grower in providing more controllable cultivation during plant flowering or fruiting morphology.

However, Korsten fails to disclose or teach a method of providing a temperature differential between the shoot and root systems of the plant for the improvement and/or modification of plant bast fibers; nor does Korsten state, suggest, imply or infer any motivation to do so. Korsten is also completely silent related to plant bast fibers.

It is known that when water in plants freezes, damaging consequence depends greatly on whether freezing occurs within plant cells (intra-cellular) or within spaces outside plant cells (inter-cellular). Plant intra-cellular freezing, which usually kills the cell regardless of the hardiness of the plant and its tissues, seldom occurs in nature because rates of cooling are commonly not high enough to support it.

Rates of cooling of several degrees Celsius per minute is typically needed to cause intra-cellular ice formation in plants. At rates of cooling of a few degrees Celsius per hour, segregation of ice occurs in inter-cellular spaces; which may or may not be lethal depending on the hardiness of the plant tissue. At freezing temperatures, water in the inter-cellular spaces of plant tissue freezes first, though water may remain unfrozen until temperatures drop below 19° F. (−7° C.). After initial formation of inter-cellular ice, plant cells shrink as water is lost to segregated ice, and the cells undergo "freeze-drying". This inter-cellular freeze-drying (i.e., dehydration) is strongly evidenced as the fundamental cause of plant freeze injury and subsequent plant death.

Plants protect themselves from cold stress with sugars, antifreeze proteins, and heat-shock proteins. Abundant late embryogenesis protein expression is induced by stresses and protects other proteins from aggregation due to cell freezing and desiccation. Plant antifreeze proteins differ from other antifreeze proteins in having much weaker thermal hysteresis activity, their physiological function likely inhibiting recrystallization of ice rather than preventing initial ice formation.

Another known and important aspect of plant husbandry above the root crown is the amount of water vapor in the air or a gas mixture (i.e., humidity; absolute, relative, and specific) about the plant shoot.

A related environmental parameter is dew point; the air temperature causing the air to saturate with water vapor. When further cooled, airborne water vapor will condense to form liquid water (i.e., dew, fog, or condensation). When air or a gas mixture temperature is reduced via contact with a surface that is colder than the surrounding air or gas mixture, water will condense on the surface. A surface may include a living plant and its physical surroundings such as a greenhouse interior, plants within a greenhouse, and the like. A fixed amount of water vapor results in higher relative humidity in colder air than in warmer.

When an air temperature is below the freezing point of water, the dew point is called the frost point; as frost is formed on a surface rather than condensation. The measurement of dew and frost point is related to humidity in that the higher the dew or frost point temperature; the more moisture may be held in an air/gas mixture.

What is desired is systems and methods of and for improving the growth and development of bast fiber bearing plants by providing a shoot-to-root temperature differential, wherein the provided gas mixture and/or nutrient solution temperature does not cause irremediable damage to or the death of the plant.

What is desired is systems and methods of and for improving the growth of plant bast fibers by providing a gas mixture relative humidity and gas mixture temperature to improve plant bast fibers, wherein the provided gas mixture temperature is at or below the dew point temperature of the provided gas mixture and provided relative humidity; and does not cause irremediable damage to or the death of the plant.

What is desired is systems and methods of and for improving the growth of plant bast fibers by providing a gas mixture relative humidity and gas mixture temperature to improve plant bast fibers, wherein the provided gas mixture temperature is at or below the frost point temperature of the provided gas mixture and provided relative humidity; and does not cause irremediable damage to or the death of the plant.

SUMMARY OF THE INVENTION

It is an object of the instant invention to provide a method of improving a bast fiber of a plant, the method comprising the steps of: providing a bast fiber bearing plant having roots and a shoot; providing a plant growing system configured for growing the bast fiber bearing plant, the plant growing system including a nutrient solution about the plant roots and a gas mixture circulating about the plant shoot; providing and maintaining a selected gas mixture temperature; providing and maintaining a selected nutrient solution temperature based at least in part upon the selected gas mixture temperature resulting in a desired plant shoot-to-root temperature differential of at least approximately 20° F.; whereby the provided plant shoot-to-root temperature differential induces in the bast fiber bearing plant morphogenic and/or oncogenic effect such that the bast fiber produced by the plant is modified in physical characteristic.

It is an object of the instant invention to provide a method of improving a bast fiber of a plant, wherein the bast fiber characteristic modified is overall cross-sectional diameter and thus overall fiber fineness.

It is an object of the instant invention to provide a method of improving a bast fiber of a plant, wherein the bast fiber characteristic modified is overall tensile strength.

It is an object of the instant invention to provide a method of improving a bast fiber of a plant, wherein the bast fiber characteristic modified is internodal length and thus overall fiber flexibility.

It is an object of the instant invention to provide a method of improving a bast fiber of a plant, wherein the selected gas mixture temperature is greater than the nutrient solution temperature.

It is an object of the instant invention to provide a method of improving a bast fiber of a plant, wherein the selected gas mixture temperature is less than the nutrient solution temperature.

It is an object of the instant invention to provide a method of improving a bast fiber of a plant, wherein the selected shoot-to-root temperature differential is greater than approximately 35° F.

It is an object of the instant invention to provide a method of improving a bast fiber of a plant, wherein the selected gas mixture temperature is above approximately 65° F. and below a temperature which causes irreparable damage to or the death of the plant.

It is an object of the instant invention to provide a method of improving a bast fiber of a plant, wherein the selected nutrient solution temperature is below approximately 50° F. and above a temperature which causes irreparable damage to or the death of the plant.

It is an object of the instant invention to provide a method of improving a bast fiber of a plant, wherein the gas mixture humidity and temperature are below the gas mixture dew point.

It is an object of the instant invention to provide a method of improving a bast fiber of a plant, wherein the gas mixture temperature is above 75° F. and the relative humidity below approximately 30%.

It is an object of the instant invention to provide a method of improving a bast fiber of a plant, wherein the shoot-to-root temperature differential is based at least in part on the plant variety, based at least in part on the plant nutrient solution N-P-K concentration level, and based at least in part on the growth phase of the plant.

It is an object of the instant invention to provide a method of improving a bast fiber of a plant, wherein the gas mixture comprises air.

It is an object of the instant invention to provide a method of improving a bast fiber of a plant comprising the step of increasing the carbon-dioxide level of the air based at least in part upon the selected nutrient solution temperature and at least in part on the selected air temperature.

It is an object of the instant invention to provide a method of improving a bast fiber of a plant, wherein any change to the selected gas mixture temperature or the selected nutrient solution temperature is made in less than approximately 20° F. increments during any one twenty-four-hour period.

It is an object of the instant invention to provide a method of improving a bast fiber of a plant, the method comprising the steps of: providing a plant having roots and a shoot; providing a plant growing system configured for growing the plant having roots and a shoot, the plant growing system including a plant nutrient solution about the plant roots and a gas mixture circulating about the plant shoot; lowering and maintaining either the gas mixture temperature or the nutrient solution temperature independently of the other until desired morphogenic and/or oncogenic changes to plant bast fibers is achieved; and wherein the lowered gas mixture temperature or lowered nutrient solution temperature does not cause irreparable damage to or the death of the plant.

It is an object of the instant invention to provide a plant growing system configured to grow a bast fiber bearing plant having roots and a shoot, the bast fiber bearing plant growing system comprising: a nutrient solution located about the roots of the plant; a gas mixture circulating about the shoot of the plant; wherein a temperature of gas mixture is selected and maintained independently of a temperature selected and maintained of the nutrient solution; wherein a nutrient solution to gas mixture temperature differential of at least approximately 15° F. is provided for and to the plant; and whereby morphogenic and/or oncogenic changes by and to the plant modify the bast fibers produced by the plant in accordance with the shoot-to-root temperature differential provided without causing irreparable damage to or the death of the plant.

It is an object of the instant invention to provide a plant growing system configured to grow a bast fiber bearing plant having roots and a shoot, the bast fiber bearing plant growing system comprising: a nutrient solution located about the roots of the plant; a gas mixture circulating about the shoot of the plant; wherein the selected temperature of gas mixture is selected independently of the selected temperature of the nutrient solution; wherein a nutrient solution to gas mixture temperature differential of at least approximately 15° F. is provided; and whereby morphogenic and/or oncogenic changes by and to the plant modify the bast fibers produced by the plant in accordance with the shoot-to-root temperature differential provided without causing irreparable damage to or the death of the plant.

It is an object of the instant invention to provide a plant growing system configured to grow a bast fiber bearing plant having roots and a shoot, wherein the system is insulated, air-tight, and water-tight to the extent required as to maintain the temperature differential between the plant root and the plant shoot.

It is an object of the instant invention to provide a plant growing system configured to grow a bast fiber bearing plant having roots and a shoot, further comprising material placed between the plant shoot and the plant root to maintain the temperature differential between the plant root and the plant shoot.

It is an object of the instant invention to provide a plant growing system configured to grow a bast fiber bearing plant having roots and a shoot, further comprising material suspended over or about the plant shoot to provide a temperature differential between the plant root and the plant shoot.

It is an object of the instant invention to provide a plant growing system configured to grow a bast fiber bearing plant having roots and a shoot, further comprising an irrigation system to deliver the plant nutrient solution to the roots of the plant.

It is an object of the instant invention to provide a plant growing system configured to grow a bast fiber bearing plant having roots and a shoot, wherein the system is self-contained except for electrical input, water input, water output, and ventilation.

It is an object of the instant invention to provide a plant growing system configured to grow a bast fiber bearing plant having roots and a shoot, wherein the system is self-contained except for solar input, water input, water output, and ventilation.

It is an object of the instant invention to provide a plant growing system configured to grow a bast fiber bearing plant having roots and a shoot, wherein the system is portable.

It is an object of the instant invention to provide a plant growing system configured to grow a bast fiber bearing plant having roots and a shoot, wherein the system is configured to grow a plant in micro and/or zero gravity.

It is an object of the instant invention to provide a method of improving a bast fiber of a plant, the method comprising the steps of: providing a plant having roots and a shoot; providing a plant growing system configured for growing the plant having roots and a shoot, the plant growing system including a plant nutrient solution about the plant roots and a gas mixture circulating about the plant shoot; lowering and maintaining either the gas mixture temperature or the nutrient solution temperature independently of the other until desired morphogenic and/or oncogenic changes to plant bast fibers is achieved; and wherein the lowered gas mixture temperature or lowered nutrient solution temperature does not cause irreparable damage to or the death of the plant.

DETAILED DESCRIPTION OF THE INVENTION

Figure 1:
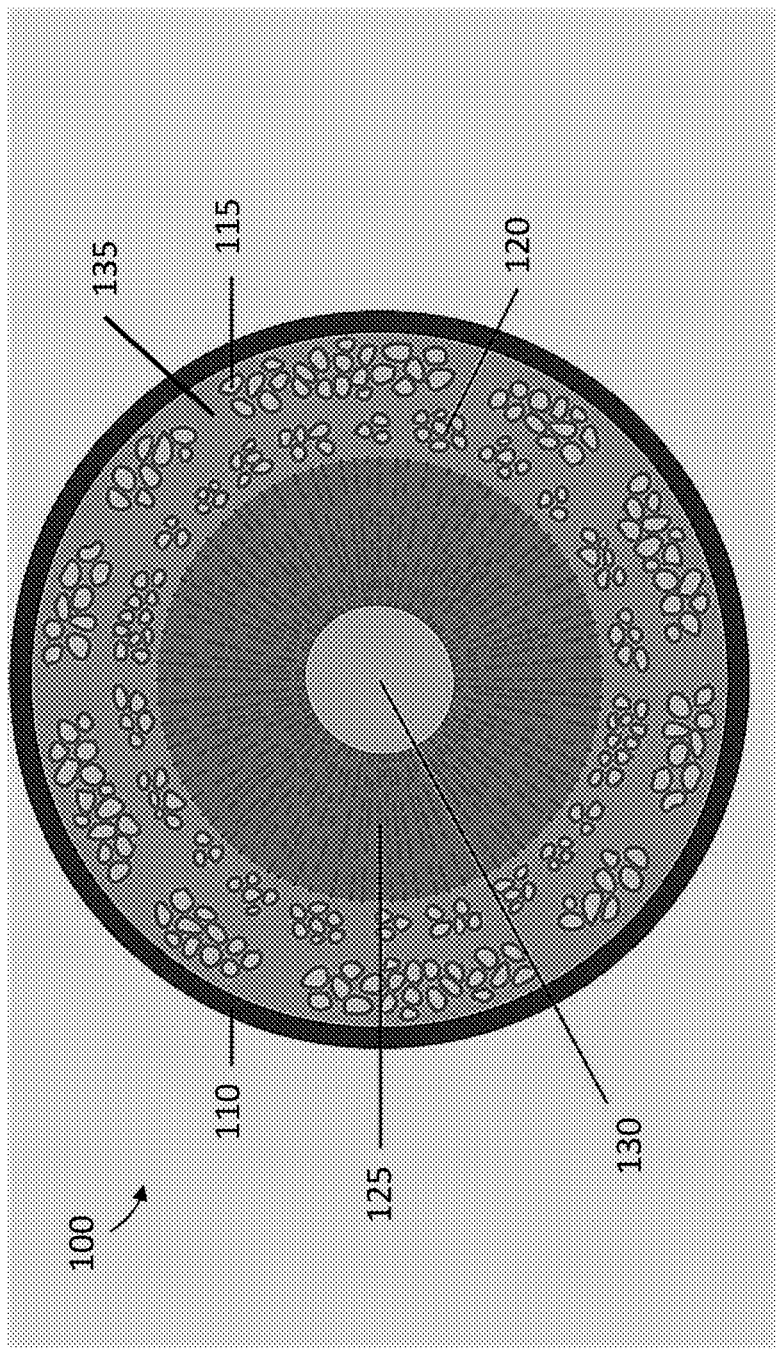
FIG. 1 is a PRIOR ART fundamental schematic cross-sectional diagram of a bast fiber bearing plant stem.
Figure 2:
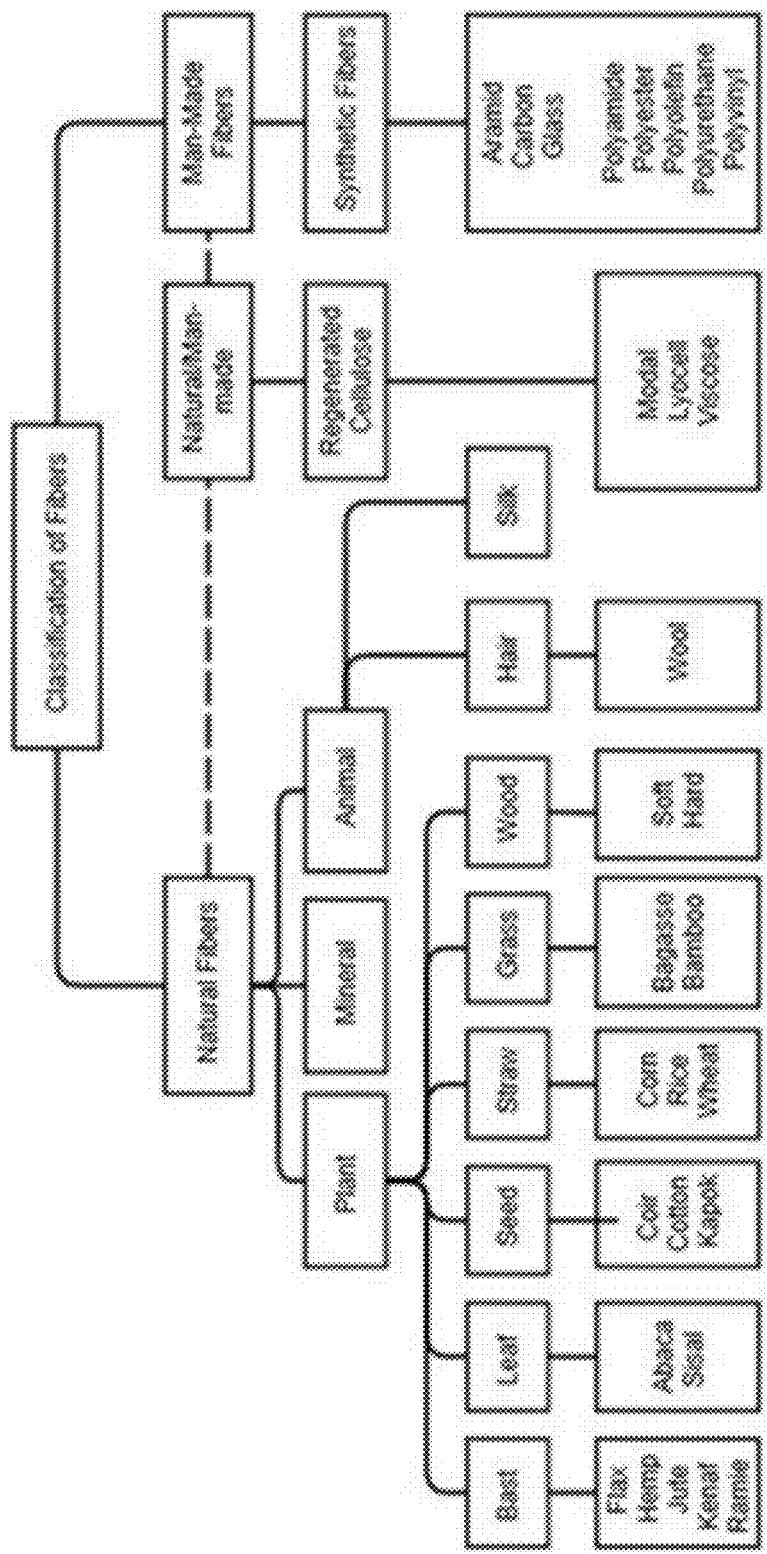
FIG. 2 is a PRIOR ART categorization chart of various fiber types.
Figure 3:
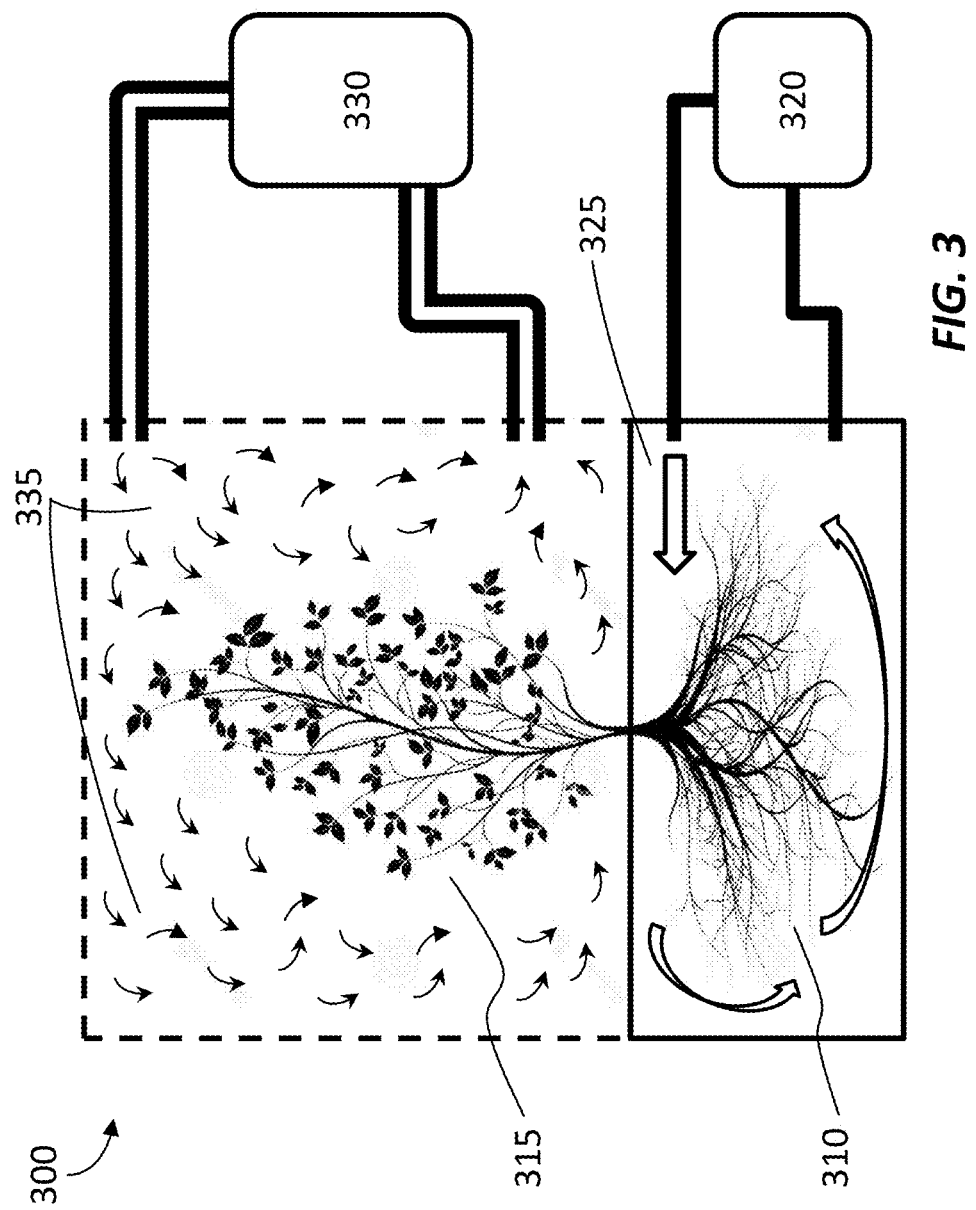
FIG. 3 is a schematic diagram of an embodiment of the inventive method and system.

As depicted in FIG. 3, the inventive method and system provides a plant growing system (300) configured for growing a plant having roots (310) and a shoot (315). The plant growing system includes a plant nutrient solution (320) about (325) the plant roots (310) and a gas mixture (330) circulating about (335) the plant shoot (315).

It is contemplated that the plant growing system (300) is insulated, air-tight, and water-tight to the extent required as to maintain a desired temperature differential between the plant root (310) and plant shoot (315), and a selected humidity of the gas mixture surrounding the plant shoot.

Many and varied plant growing system types and techniques may be provided; such as hydroponic drip, ebb and flow, nutrient film technique, deep water culture, wick systems, aquaponic system, and the like, and to include known configurations which may be easily adapted to independently select and maintain both plant root (310) and plant shoot (315) temperatures, and independently provide a selected gas mixture humidity.

Figure 4:
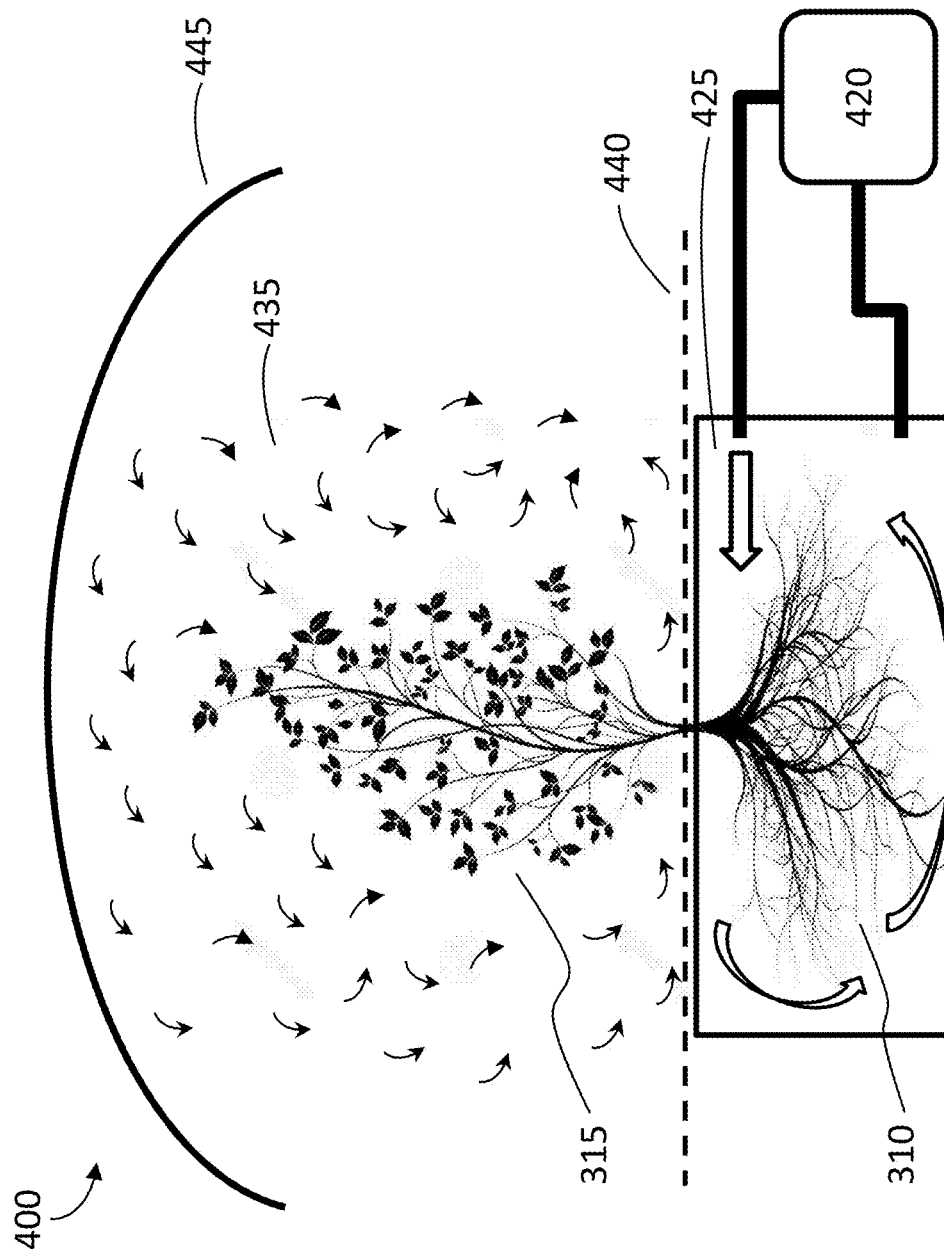
FIG. 4 is a schematic diagram of an embodiment of the inventive method and system.

As depicted in FIG. 4, the inventive method and system provides a plant growing system (400) adapted for outdoor hydroponic or aquaponic cultivation of a plant having roots (310) and a shoot (315). The plant growing system (400) includes a plant nutrient solution (420) about (425) the plant roots (310) and allows for air to circulate about (435) the plant shoot (315).

It is contemplated that the plant growing system is insulated and water-tight to the extent required as to maintain a desired temperature differential between the plant root (310) and plant shoot (315). Additionally, insulative light reflecting or absorbing material (440) may be placed between the plant shoot and root to facilitate and maintain a desired temperature differential. Still further, insulative or dissipative light reflecting, or absorbing material (445) may be suspended over the plant shoot (315) to facilitate and maintain a desired temperature differential. Many and varied plant growing system (400) types and techniques may be provided; such as hydroponic drip, ebb and flow, nutrient film technique, deep water culture, wick systems, aquaponic system, and the like, and to include known configurations which may be easily adapted to select and maintain a plant root (310) temperature independently of the circulating air (435) temperature and/or plant shoot (315) temperature.

Figure 5:
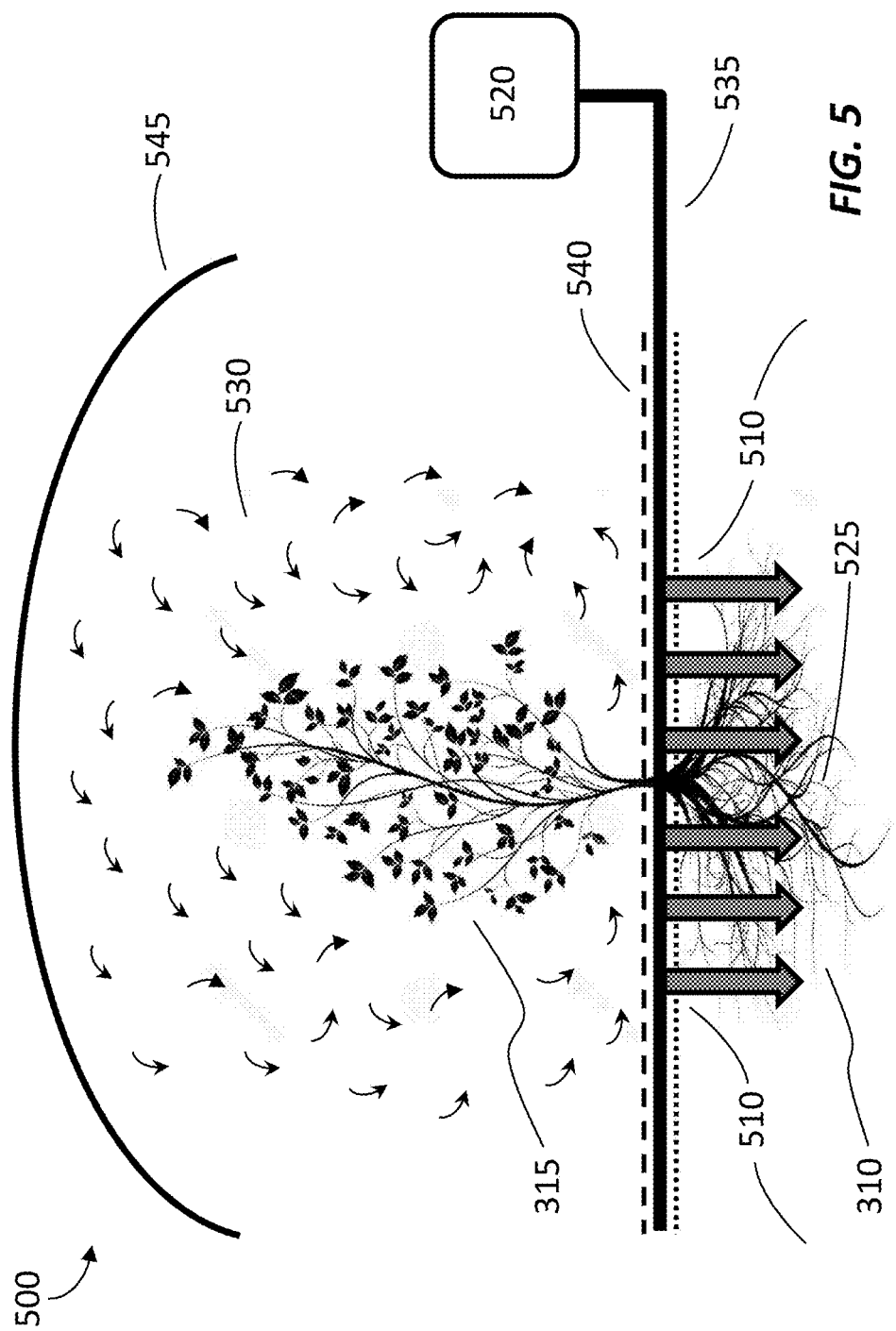
FIG. 5 is a schematic diagram of an embodiment of the inventive method and system.

As depicted in FIG. 5, the inventive method and system provides a plant growing system (500) adapted to outdoor soil (510) based irrigation farming of a plant having roots (310) and a shoot (315). The plant growing system (500) includes an irrigation plant nutrient solution (520) which is conveyed to the plant roots (525) via conventional irrigation means other than "through the air broadcast" or "sprinkler type" techniques. Preferably, drip or troth type irrigation techniques are used as to not alter the shoot (315) temperature of the plant when a temperature differential is desired. Based at least in part on the temperature of the air allowed to circulate about (530) the plant shoot (315), the irrigation plant nutrient solution (520) temperature is selected to provide a desired shoot to root temperature differential.

It is contemplated that the plant growing system (500) is insulated and water-tight to the extent required as to maintain a desired temperature differential between the plant root (310) and plant shoot (315). An exemplary plant growing system includes irrigation pipe (535) conveying irrigation nutrient solution (520) through the soil (510) and about (525) the plant roots (310). Additionally, insulative or dissipative light reflecting, or absorbing material (540) may be placed between the plant shoot and root to facilitate and maintain a desired shoot to root temperature differential.

Still further, insulative or dissipative light reflecting, or absorbing material (545) may be suspended over the plant shoot (315) to facilitate and maintain a desired temperature differential. Many and varied outdoor soil-based plant growing system (500) and techniques may be adapted to select and maintain a plant root (310) temperature independently of the circulating air (530) temperature and/or plant shoot (315) temperature.

Hereinafter, an approximate 20° F. or greater shoot to root temperature differential will be symbolized either as a ">20° F.+/−" or as a ">20° F.−/+" temperature condition; the first position representing selected shoot temperature, and the second position representing selected root temperature, and the "+" and "−" indicative of whether the shoot or root temperature is above or below the other.

Hereinafter, an approximate 0° F. shoot to root temperature differential will be symbolized as a "0° F. S/R" temperature condition.

During instant inventor experimentation, two groups of four genetically identical C. sativa L. seedlings (cuttings) were placed in identical growing environments except a first group's shoots were maintained at 75° F. (a 0° F. S/R temperature condition), while the second group's roots were transitioned to and maintained at 45° F. (a ">20° F.+/−S/R" temperature condition) during plant vegetative growth.

After 90 days of vegetative growth, the >20° F.+/−S/R group had main stems much thinner than the 0° F. S/R group. Also observed was high internodal length, and thin leaves as compared to the 0° F. S/R group. Cross sectional examination of the stems revealed bast fibers of approximately half the diameter of the 0° F. S/R group.

In certain inventive embodiments, it is contemplated that further providing a relative humidity below 30 percent in conjunction with a >20° F.+/−shoot-to-root temperature condition further decreases the diameter or fineness of plant stem bast fibers.

During instant inventor experimentation, two groups of four genetically identical C. sativa L. seedlings (cuttings) were placed in identical growing environments with both group's root temperature being maintained at 75° F. The first group's shoots were maintained at 75° F. (a "0° F. S/R" temperature condition), while the second group's shoots were transitioned to and maintained at 45° F. (a ">20° F.−/+S/R" temperature condition) during plant vegetative growth.

After 90 days of vegetative growth, the >20° F.−/+S/R group had main stems approximately 15-20% taller and 100-150% thicker than the 0° F. S/R group. Also observed was higher internodal length, and moderately thick and tough leaves as compared to the 0° F. S/R group. Cross sectional examination of the stems revealed bast fibers of approximately twice the diameter of the 0° F. S/R group.

In certain inventive embodiments, it is contemplated that further providing a relative humidity above 70 percent in conjunction with a >20° F.−/+shoot-to-root temperature condition further increases the diameter or coarseness of plant stem bast fibers.

While not wishing to be bound by any one theory or combination of theories, after instant inventor experimentation, it is accepted as true by the inventor that: the timing, sequence, and range of shoot-to-root temperature differentials selected during plant development and the gas mixture humidity about a plant shoot may be utilized to improve, modify, and/or alter, at least one physical characteristic of a bast fiber of a plant grown utilizing the shoot-to-root temperature differential; and, thereby improve the bast fiber of a plant grown for industrial, scientific, and medical purposes.

While not wishing to be bound by any one theory or combination of theories, after instant inventor experimentation, it is accepted as true by the inventor that while maintaining a plant root system below approximately 55° F.; and providing a shoot temperature and humidity of or in four general categories: low temperature with low humidity (cold and dry), low temperature and high humidity (cold and wet), high temperature and low humidity (hot and dry), and high temperature and high humidity (hot and wet); may be utilized to improve, modify, and/or alter, at least one physical characteristic of a bast fiber of a plant grown for industrial, scientific, and medical purposes.

While not wishing to be bound by any one theory or combination of theories, after instant inventor experimentation, it is accepted as true by the inventor that while maintaining a plant root system above approximately 60° F.; and providing a shoot temperature and humidity of or in four general categories: low temperature with low humidity (cold and dry), low temperature and high humidity (cold and wet), high temperature and low humidity (hot and dry), and high temperature and high humidity (hot and wet); may be utilized to improve, modify, and/or alter, at least one physical characteristic of a bast fiber of a plant grown for industrial, scientific, and medical purposes.

When changes are made in plant environmental temperature, preferably the change should be made gradually rather than abruptly; as to avoid overly stressing the plant or causing the freezing and death of plant cells. Preferably, selected gas mixture temperature and/or plant nutrient solution temperature changes should be less than approximately 20° F. in any one twenty-four-hour period.

It should be understood that all Figures herein are merely illustrative of various aspects of the instant inventive method and system and are not intended to be accurate or to scale as to time, temperature, or physical dimensions related to the described inventive shoot to root temperature sequence.

Although the inventive method and system has been described with reference to a particular sequence of shoot to root temperature differentials, temperature values, humidity values, and the like, these are not intended to exhaust all possible sequences, temperatures or humidity's, and indeed many other modifications and variations will be ascertainable by those of ordinary skill in the art for improving plant bast fibers.

It is contemplated that various plant families and genera may be improved by practicing the inventive systems and methods, without departing from the objectives and scope of the instant invention. It is contemplated this group includes modern green algae, seedless non-vascular, seedless vascular, gymnosperm, and angiosperm plant families.

The instant invention as described is not to be limited by the embodiments as shown in the drawings and/or as described in the specification, since these are given by way of example only and not by way of limitation.

Having thus described several embodiments for practicing the inventive systems and methods, its advantages and objectives may be understood. Variations from the drawings and description may be made by one skilled in the art without departing from the scope of the invention, which is to be determined from the following claims.

What is claimed is:

1. A method of improving a bast fiber of a plant of and from the family Cannabaceae sensu stricto and species *cannabis*, the method comprising the steps of:
    providing a plant of and from the family Cannabaceae sensu stricto and species *cannabis* having roots and a shoot;
    providing a plant growing system configured for growing the plant having roots and a shoot, the plant growing system including a plant nutrient solution about and surrounding the plant roots having a temperature between thirty-five degrees and fifty-five degrees Fahrenheit and including air circulating about and surrounding the plant shoot having a temperature above seventy-five degrees Fahrenheit; thereby
    providing and maintaining with the plant growing system a shoot-to-root temperature differential of at least twenty degrees Fahrenheit to the plant continuously and throughout the entirety of both the vegetative and flora growth phases of the plant;
    the plant being harvested at a preferred and selected time during the flora growth phase of the plant; whereby
    the provided at least twenty degrees Fahrenheit shoot-to-root temperature differential causes reduced nutrient translocation by and within the plant resulting in significant and desired reduction in the overall diameter of the plant bast fibers.

2. A method of improving a bast fiber of a plant of and from the family Cannabaceae sensu stricto and species *cannabis*, the method comprising the steps of:
    providing a plant of and from the family Cannabaceae sensu stricto and species *cannabis* having roots and a shoot;
    providing a plant growing system configured for growing the plant having roots and a shoot, the plant growing system including a plant nutrient solution about and surrounding the plant roots having a temperature between thirty-five degrees and fifty-five degrees Fahrenheit and having air circulating about and surrounding the plant shoot having a temperature above seventy-five degrees Fahrenheit; thereby
    providing and maintaining a shoot-to-root temperature differential of at least twenty degrees Fahrenheit to the plant continuously and throughout the entirety of the vegetative growth phase of the plant; and
    the plant being harvested before the onset of the flora growth phase of the plant; whereby
    the provided at least twenty degrees Fahrenheit shoot-to-root temperature differential causes reduced nutrient translocation by and within the plant resulting in significant and desired reduction in the overall diameter of the plant bast fibers.

3. A method of improving a bast fiber of a plant of and from the family Cannabaceae sensu stricto and species *cannabis*, the method comprising the steps of:
    providing a plant of and from the family Cannabaceae sensu stricto and species *cannabis* having roots and a shoot;
    providing a plant growing system configured for growing the plant having roots and a shoot, the plant growing system including a plant nutrient solution about and surrounding the plant roots having a temperature between thirty-five degrees and fifty-five degrees Fahrenheit and including air circulating about and surrounding the plant shoot having a temperature above seventy-five degrees Fahrenheit; thereby providing and maintaining with the plant growing system a shoot-to-root temperature differential of at least twenty degrees Fahrenheit to the plant continuously and throughout the entirety of both the vegetative and flora growth phases of the plant; and the plant being harvested at a preferred and selected time during the flora growth phase of the plant; whereby the provided at least twenty degrees Fahrenheit shoot-to-root temperature differential causes reduced nutrient translocation by and within the plant resulting in significant and desired reduction in plant bast fiber internodal length.

4. A method of improving a bast fiber of a plant of and from the family Cannabaceae sensu stricto and species *cannabis*, the method comprising the steps of:

providing a plant of and from the family Cannabaceae sensu stricto and species *cannabis* having roots and a shoot;

providing a plant growing system configured for growing the plant having roots and a shoot, the plant growing system including a plant nutrient solution about and surrounding the plant roots having a temperature between thirty-five degrees and fifty-five degrees Fahrenheit and having air circulating about and surrounding the plant shoot having a temperature above seventy-five degrees Fahrenheit; thereby providing and maintaining a shoot-to-root temperature differential of at least twenty degrees Fahrenheit to the plant continuously and throughout the entirety of the vegetative growth phase of the plant; and the plant being harvested before the onset of the flora growth phase of the plant; whereby the provided at least twenty degrees Fahrenheit shoot-to-root temperature differential causes reduced nutrient translocation by and within the plant resulting in significant and desired reduction in plant bast fiber internodal length.

* * * * *